United States Patent [19]
Schroth

[11] 3,720,197
[45] March 13, 1973

[54] SOLAR ENERGY FOR WARMING OBJECTS, SUCH AS GOLF BALLS AND THE LIKE

[76] Inventor: John J. Schroth, 19 Buttonwood Drive, Doylestown, Pa. 18901

[22] Filed: May 21, 1971

[21] Appl. No.: 145,620

[52] U.S. Cl. ..................................................126/270
[51] Int. Cl. ...............................................F24j 3/02
[58] Field of Search..............................126/270, 271

[56] References Cited

UNITED STATES PATENTS

| | | | |
|---|---|---|---|
| 1,442,696 | 1/1923 | Nutt | 126/270 |
| 3,236,227 | 2/1966 | Steinberg | 126/270 |
| 3,363,618 | 1/1968 | Dominguez | 126/270 |
| 3,391,688 | 7/1968 | Dery | 126/270 |

*Primary Examiner*—Kenneth W. Sprague
*Assistant Examiner*—Harold Joyce

[57] ABSTRACT

This invention relates to the efficient utilization of solar energy, to a practical level, for the warming or heating of objects such as golf balls and the like.

The device is portable and comprises a clear, insulated cover, a black, conductive absorber plate and an insulated carrying base.

Ultra-violet and visible light is admitted and trapped within the casing and is converted to infra-red by the absorber plate. The absorber plate conducts the heat generated, by the conversion to infra-red, through means of intimately contacting pockets containing the objects being warmed.

11 Claims, 7 Drawing Figures

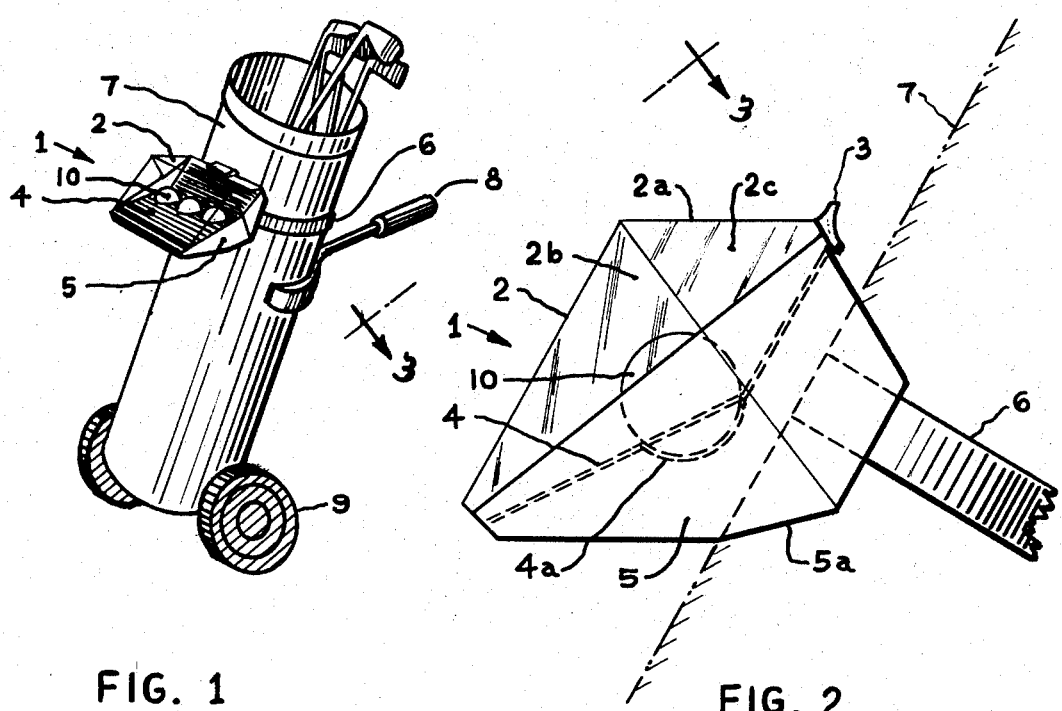
FIG. 1
FIG. 2
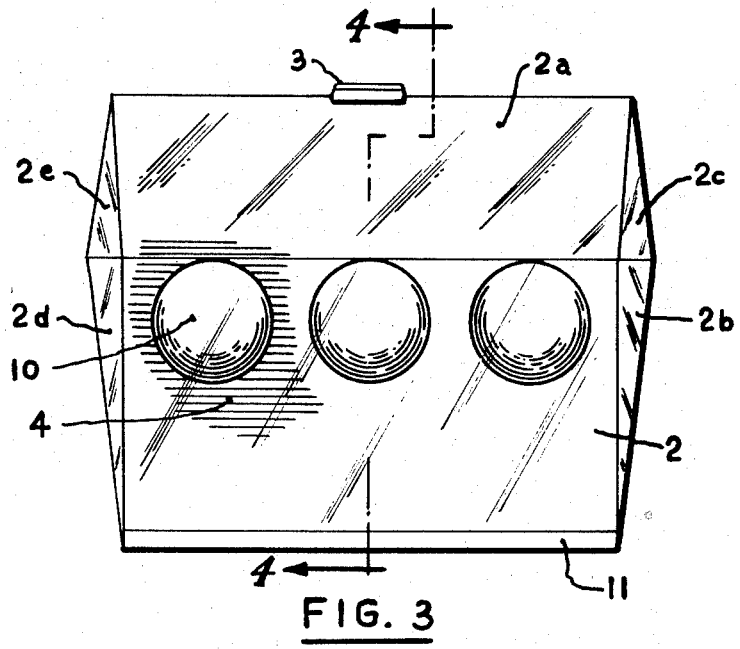
FIG. 3
INVENTOR:
JOHN J. SCHROTH

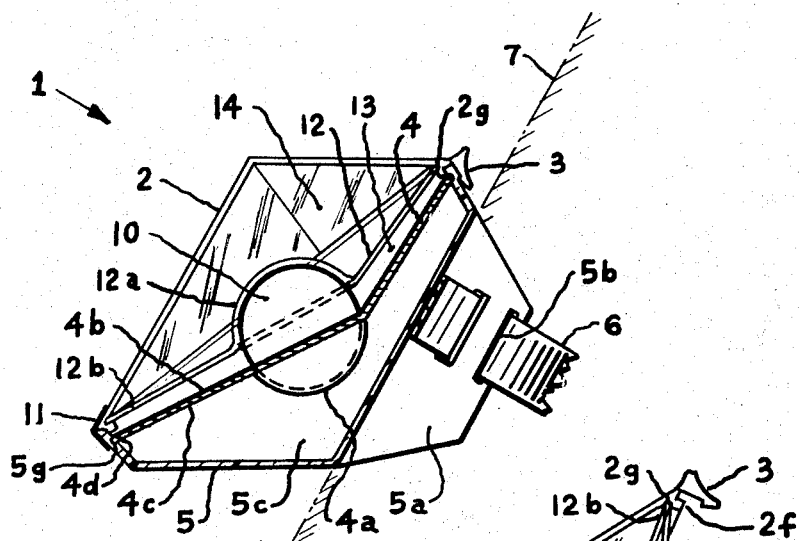
FIG. 4
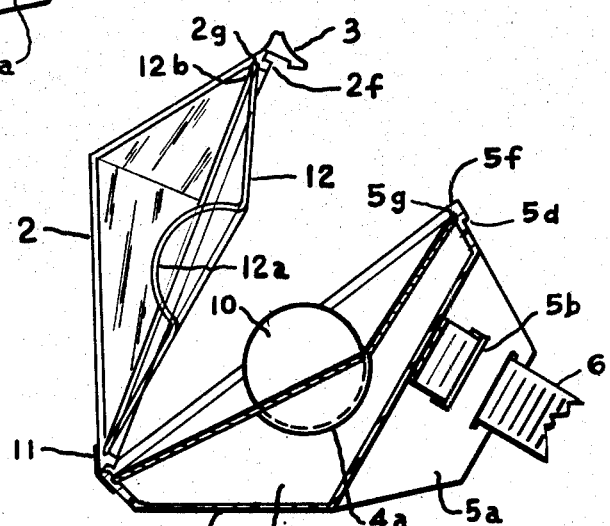
FIG. 5
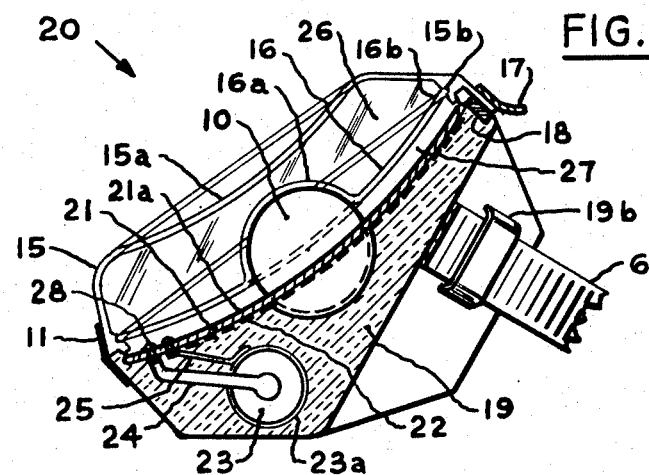
FIG. 6
FIG. 7
INVENTOR:
JOHN J. SCHROTH

SOLAR ENERGY FOR WARMING OBJECTS, SUCH AS GOLF BALLS AND THE LIKE

BACKGROUND OF THE INVENTION

Golfing can be a pleasant, recreational experience during the colder months so long as the sun is shining warming the participants with its radiant heat. The golf ball, however, is small and white (usually) and having an elastomeric core is sensitive to the cold. Consequently, the ball loses its resilience with decreasing temperature and yardage or driving distance suffers accordingly.

Golfers commonly store their balls in their pockets or employ hand warmers or other means to warm the ball in order to realize additional yardage.

Recently, solar energy was introduced as a means of warming golf balls. This principle is illustrated in U. S. Pat. No. 3,497,676, in which I played an active part and am co-inventor.

My invention, described hereinafter, relates to the advancement in the art and reduction to practice of the use of solar energy for heating golf balls and like objects. My invention is efficient and effective as gauged by the capability to significantly increase the temperature of the ball or object to attain the performance results sought.

To prove the concepts of my invention, I constructed several working models and conducted extensive tests under field and winter conditions at Doylestown, Pa. which has a latitude of approximately 40¼° North.

The measure of effectiveness of the solar energy warmer when used to warm golf balls is gauged by the ability to increase the ball temperature above ambient temperature, the logic being that the ball nearly assumes the ambient temperature of the ground and air when it is played. Thus, an efficient ball warmer will produce a warm ball for tee-off at some subsequent hole. The warm ball at tee-off is of vital importance to golfer seeking the long initial drive.

The results of many tests proved conclusively my invention to be 150 to 250 percent more effective than previous solar type warmer.

Instrumentation used to record ball temperatures consisted of thermocouples embedded inside the golf balls and a pyrometer (galvonometer).

Typical results attained in tests on a clear 22° F. winter day are as follows:

| Time in Warmer | Ball Temp. Attained | Rise above Ambient |
|---|---|---|
| 30 minutes | 92° F. | 70° F. |
| *45 | 110 | 88 |
| 60 | 122 | 100 |
| | 134 peak-out | 112 |

* Note: 45 minutes is the time the ball is considered to be in the Warmer when playing four balls alternately, one ball in play and three in the warmer.

SUMMARY OF THE INVENTION

The Object of the Invention is as follows:
- to provide an efficient and effective device for heating golf balls and the like by solar energy,
- to provide large window and absorber areas for the effective gathering and conversion of solar energy,
- to employ a non-directional window or clear cover which will effectively admit sun rays over a wide range of angles,
- to retain converted heat through the insulating qualities of plastic materials and trapped air spaces,
- to utilize an absorber having a surface which readily absorbs light energy but reradiates a minimum of infra-red energy,
- to provide an absorber plate having high heat conductivity and contoured to fit balls or objects, for efficient conduction of converted heat into the objects being warmed,
- to provide a base accommodating supplementary heating means, such as electric resistance heating, burning of fuel or storage of a preheated mass having a high specific heat value,
- to provide a commercial structure having aesthetic appearance, practical manufacture, impact, weather and ultra-violet resistance, and functional.

BRIEF DESCRIPTION OF DRAWINGS

FIG. 1 illustrates a perspective view showing the typical mounting of the Golf Ball Warmer on the golf bag and golf cart.

FIG. 2 shows the side elevation of the Golf Ball Warmer.

FIG. 3 is a view of the Golf Ball Warmer as seen from the skyward direction of the sun's rays.

FIG. 4 is a cross section view of the Golf Ball Warmer defining the internal construction.

FIG. 5 is also a cross sectional view showing the cover in a hinged-open position.

FIG. 6 is an enlarged sectional detail of the hinged area.

FIG. 7 is a cross section drawing of an alternate construction featuring a concave cover, foam-plastic base and battery power source.

DETAILED DESCRIPTION

Referring now to the drawings in detail, FIG. 1 generally shows the Golf Ball Warmer as an assembly 1, secured to golf bag 7, by means of belt 6. Some major portions of the Ball Warmer are visible such as the clear cover 2, the opaque, insulated base 5, the black absorber plate 4 in which are nestled a plurality of golf balls 10 being warmed by the sun's rays.

The golf bag 7, in turn is supported by a golf cart whose handle 8 and wheels 9 are seen. The golf cart is the common means of transporting the golfing equipment around the course. The player or caddy orients the golf cart, as often as possible, so that the ball warmer 1, is directly exposed to the sun's rays for optimum solar heating results.

The detailed construction of the ballwarmer 1, may best be understood by reference to FIG. 4 cross section.

In FIG. 4, the sun's rays ideally would come in the direction from the upper left, striking the main outer cover panel 2, perpendicularly. The visible and ultraviolet rays would pass through cover 2, through trapped air space 14, and inner cover 12, through trapped air space 13, and then strike absorber plate 4. The absorber 4, is an aluminum plate, selected for its high heat conductivity, the exposed side of which is coated with a black matte surface 4b, which absorbs and converts the light energy into infra-red energy. Covers 2 and 12 function on the "greenhouse" principle, i.e., they are transparent to visible light but are opaque to the infra-red energy converted at the absorber plate 4. Thus, the heat converted within the ball warmer 1, is retained to a high degree by the opacity of the covers 2 and 12, the trapped air spaces 13 and 14, and the insulating qualities of the base 5.

The underside surface 4c, of the absorber 4, is a highly polished finish which minimizes the radiation of infra-red to the walls of base 5. The absorber plate edges 4d, fit snugly into grooves 5g, of the base 5, to create the insulating air space 5c. The base 5 is molded of plastic which inherently is an excellent insulating material.

Cover 2, is a rigid, clear plastic molded material, such as Polycarbonate, selected for light transmissibility, ultra-violet stability and impact resistance. Inner cover 12 may be made of a similar material, either molded or vacuum formed of sheet stock, shaped with a plurality of hemispherical pockets 12a, and to form a minimum air cavity 13, adjacent to absorber 4. The inner cover edges 12b, snap into and engage outer cover grooves 2g, to form a seal for trapped air space 14.

Absorber plate 4, is provided with a plurality (three illustrated) of hemispherical pockets 4a, which intimately contact the ball 10 over a large area. This intimate contact promotes the efficient transfer of heat generated in and conducted through the absorber plate 4, into the pockets 4a, and then into the balls 10.

Air space 13, is held to a minimum volume for this amount of air is displaced or diluted by outside air whenever the cover 2, is hinged opened to remove and insert balls into the warmer 1.

The hinge details are best seen by referring to FIGS. 5 and 6. The hinge 11, is simply comprised of a polyester (Mylar) tape and silicone pressure sensitive adhesive. This construction provides a simple, effective hinge and seal with excellent strength and flexural durability. Furthermore, the tape hinge 11, is readily replaceable. However, the need for replacement is remote as indicated by outdoor exposure tests which I have conducted. This material exhibited excellent strength and flexibility and bonding in over 2 years of continuing outdoor exposure to all weather elements.

To open cover 2, latch 3 is manually disengaged from cover projection 5d. Upon closing cover 2, projection 2f, which extends around all four sides of cover 2, recesses into base 5 and in conjunction with surface 5f, forms a tight and efficient seal.

Referring back to FIG. 4, base 5, has a concave, cylindrical curvature, surface 5a, which forms a saddle conforming with the general shape of the golf bag 7. Belt 6, is laced through two integrally molded straps 5b, and is buckled (not shown) around the golf bag 7.

FIG. 3 best illustrates the main panel 2 of the outer cover, top panel 2a, and side panels 2b, 2c, 2d and 2e. The faceted configuration lends to the acceptance of the sun's rays from a wide range of angular positions, as well as a practical form for injection molding and pleasing aesthetics. Also indicated is the absorber plate 4 identified by shading confined to one area for clarity. The absorber plate 4, is essentially equal to the projected areas of outer cover panels 2 and 2a.

Effective solar heating may be obtained when the window or cover area and the absorber area each are large in respect to the projected area of the balls or objects being warmed. In my tests with the golf ball warmers I found this ratio should be in the order of 5 or 10:1, as contrasted to 2:1 typical of the design of early ball warmers as described in U.S. Pat. No. 3,497,676.

The combination of the large window-absorber area and the black surfaced metal absorber plate 4, account for a substantial amount of the successful results of my invention. Preferably, the black coating 4b, should have microscopic voids. While the coating appears to be black to the unaided eye, the microscopic bright metal dots act as reflector preventing reradiation. Thus the absorber has a high admittance to emittance ratio, that is, it readily absorbs light energy but does not reradiate the infra-red energy thereby tending to retain the heat converted.

In my testing outdoors, I compared the performance of various cover-absorber combinations. The most effective combination was the transparent dual (inner-outer) cover and the black front surfaced aluminum absorber plate. Other less effective combinations evaluated were: deletion of the inner cover;
the inner cover being the absorber (black front surface formed aluminum); the inner cover coated with black second surface adjacent to the balls; and, surprisingly, the preferred combination but with the dimples of the balls filled with a black coating.

FIG. 7 illustrates a Golf Ball Warmer 20, forming an alternate construction comprised of features within the scope of this invention. Many common features will be recognized immediately, however, the primary differences are in the the concave cover 15, the auxiliary battery power source 23, the molded structural foam base 19, and magnetic latch 17.

Outer cover 15, and inner cover 16, are made of a clear plastic material as described for Ball Warmer 1, above. The inner and outer covers are joined together by inner cover edges 16b, interlocking into outer cover grooves 15b, to form trapped air space 26.

Outer cover 15, incorporates a main panel 15a, which is a spherical, concave light gathering surface oriented in the general direction of the sun. The concave surface 15a, permits a large portion of this surface to admit the sun's rays with a minimum amount of reflectance. Also, it can be noted, that light rays have a more direct and uniform path in passing through the outer cover panel 15a, air space 26, inner cover 16, air space 27, to impinge upon the black absorber surface 21a, of absorber plate 21. This direct and uniform path results from the essential parallelism of surface 15a, cover 16, and absorber 21.

The solar heating principle in Ball Warmer 20, is identical to the principle described above for Ball Warmer 1.

Base 19, is molded of a light, structural foam plastic such as polyurethane, polyethylene, etc., which has excellent insulating and strength qualities, and can be molded with an integral skin (outer surface) for attractive appearance and durability.

Molded integrally with the base 19, by the placement of parts into the mold before the polyurethane foam material is poured, are the metal parts and subassemblies associated with the absorber 21, the battery shell 23, permanent magnet 18, and belt straps 19b. Polyurethane is inherently a tough and effective adhesive, therefore, these parts are firmly anchored upon completion of the molding of base 19.

The auxiliary battery operated warming system, used to supplement or replace solar energy heating, is comprised of battery shell 23a, into which is placed the battery 23, contacting conductors 24 and 25, which connect to a flexible printed circuit type of resistance heating blanket 22, cemented or otherwise fastened to the underside of absorber plate 21. The conductors 24 and 25, are secured to the resistance circuit 22, and absorber plate 21, by two plastic, insulating rivets 28.

Cover 15, is hingeably mounted on base 19, by means of tape hinge 11, and is held in the closed position by latch 17, made of a ferrous, magnetic material, in close proximity to the permanent magnet 18.

Many other variations in feature and construction are obvious to the inventor and to those skilled in the art which fall within the scope of this invention. Having described the invention, I claim:

1. A solar energy device, for warming golf balls and other objects, comprised of a hingeable, transparent cover cooperating with an insulated base which supports an absorber plate having formed pockets to embrace the objects being warmed, wherein,
   a. said cover is comprised of an outer and an inner section with entrapped, insulating air between,
      1. the outer cover being shaped to admit sun rays from a wide range of angles, and
      2. the inner cover formed to have pockets for holding the objects in contact with the absorber plate, and to minimize the displaceable air between the cover and and the absorber,
   b. said absorber plate is made of highly heat-conductive material, having,
      1. a front surface optical coating of a high absorbance and low emittance characteristic, and
      2. formed retaining pockets to intimately contact the objects over a large area to promote efficient conductance of heat from the absorber,
   c. said cover and said absorber plate each have a relatively large projected area in respect to the projected area of the objects,
   d. said base and said cover are cooperatively joined along one edge by a hinge and along the opposite edge by a manually operated latch.

2. A solar warming device, as described in claim 1, wherein the absorber is made of an aluminum plate having a black front surface coating with microscopic voids, and said absorber forming one wall enclosing an air insulating compartment in the supporting, insulated base.

3. A solar warming device, as described in claim 1, wherein the outer cover comprises a plurality of surface facets to favorably admit sun rays from a wide range of angular positions.

4. A solar warming device, as described in claim 1, wherein the outer cover has a concave dish shape to minimize reflection of sun rays arriving over a broad range of relative angles.

5. A solar warming device, as described in claim 1, wherein the hinge connecting the cover and base members is comprised of a strong, flexible plastic tape coated with a pressure sensitive adhesive, capable of retaining their strength, flexibility and bonding characteristics under prolonged outdoor exposure.

6. A solar warming device, as described in claim 1, wherein the latching means is comprised of a latch made of a magnetic material in close proximity to a permanent magnet retained in the base.

7. A solar warming device, as described in claim 1, wherein the base is made of a rigid structural, insulating foam plastic material molded integrally or to conform with the absorber plate and other adjacent components including latch, belt straps and auxiliary heating elements.

8. A solar warming device, as described in claim 1, wherein the insulated base houses an auxiliary heating source in the form of a preheated mass having a high specific heat value.

9. A solar warming device, as described in claim 1, wherein the insulated base houses an auxiliary heating means comprising a resistance circuit affixed or integral with the absorber plate, connecting conductors and a battery power source.

10. A solar warming device, as described in claim 1, wherein the insulated base houses an auxiliary heating means achieved through the burning of catalytic fuel.

11. A solar warming device, as described in claim 1, wherein said cover and said absorber plate each have a minimum projected area of approximately 5 times greater than the total projected area of the objects being warmed.

* * * * *